(12) United States Patent
Hewson

(10) Patent No.: US 12,713,114 B2
(45) Date of Patent: Aug. 18, 2026

(54) METHOD AND SYSTEM FOR CREATING INTERACTION INPUT BASED ON DISPLAYED CONTENT

(71) Applicant: Hoppr Ltd, Subiaco (AU)

(72) Inventor: Jason Hewson, Subiaco (AU)

(73) Assignee: Hoppr Ltd, Subiaco (AU)

( * ) Notice: Subject to any disclaimer, the term of this patent is extended or adjusted under 35 U.S.C. 154(b) by 0 days.

(21) Appl. No.: 18/558,714

(22) PCT Filed: May 5, 2022

(86) PCT No.: PCT/AU2022/050425

§ 371 (c)(1),
(2) Date: Nov. 2, 2023

(87) PCT Pub. No.: WO2022/232884

PCT Pub. Date: Nov. 10, 2022

(65) Prior Publication Data

US 2024/0223873 A1 Jul. 4, 2024

(30) Foreign Application Priority Data

May 5, 2021 (AU) ................................ 2021901344

(51) Int. Cl.
*H04N 21/858* (2011.01)
*G06Q 30/0251* (2023.01)

(52) U.S. Cl.
CPC ....... *H04N 21/858* (2013.01); *G06Q 30/0271* (2013.01)

(58) Field of Classification Search
CPC ......................... H04N 21/858; G06Q 30/0271
See application file for complete search history.

(56) References Cited

U.S. PATENT DOCUMENTS

| | | | | |
|---|---|---|---|---|
| 9,509,742 | B2 * | 11/2016 | Gordon | H04L 65/612 |
| 2012/0138671 | A1 | 6/2012 | Gaede et al. | |
| 2015/0041530 | A1 * | 2/2015 | Burkhart | G06K 7/1404 235/494 |
| 2015/0074232 | A1 * | 3/2015 | Phillips | H04L 65/756 709/219 |
| 2015/0206177 | A1 * | 7/2015 | Yao | G06Q 30/0246 705/14.45 |

(Continued)

FOREIGN PATENT DOCUMENTS

| | | | |
|---|---|---|---|
| EP | 2704083 | A1 | 3/2014 |

OTHER PUBLICATIONS

International Search Report and Written Opinion for International Application No. PCT/AU2022/050425 dated Aug. 5, 2022, in 7 pages.

*Primary Examiner* — Mulugeta Mengesha
(74) *Attorney, Agent, or Firm* — Knobbe, Martens, Olson & Bear, LLP

(57) ABSTRACT

A method and system of creating interaction input based on displayed content comprises displaying content on a display device, the content comprising a machine readable resource locator. The resource locator is uniquely generated for a single use. The displayed content is captured with a distinct device to the display device. The machine readable resource locator is extracted from the captured displayed content. Content is accessed from the location of the resource locator. Further interaction with the content is enabled on a one to one or an individualised basis.

25 Claims, 6 Drawing Sheets

(56) References Cited

U.S. PATENT DOCUMENTS

| | | | | |
|---|---|---|---|---|
| 2016/0048604 | A1 | 2/2016 | Kandregula | |
| 2016/0171486 | A1* | 6/2016 | Wagner | G06Q 20/326<br>705/39 |
| 2017/0332113 | A1* | 11/2017 | Haritaoglu | H04N 21/8456 |
| 2017/0337289 | A1 | 11/2017 | Goyal et al. | |
| 2019/0007715 | A1* | 1/2019 | Navali | H04N 21/23655 |
| 2020/0112614 | A1* | 4/2020 | Lim | H04L 67/563 |
| 2020/0218554 | A1* | 7/2020 | Toksoz | G06F 9/485 |

* cited by examiner

METHOD AND SYSTEM FOR CREATING INTERACTION INPUT BASED ON DISPLAYED CONTENT

FIELD OF THE INVENTION

The present invention relates to methods and systems for controlling or interacting with a digital device based on displayed content.

BACKGROUND

Content, such as advertising, is pushed to a display device, such as a TV or electronic billboard, on a one to many basis. That is, the content is created to be consumed by many individuals without specific knowledge of the individuals that are consuming the content. For example, an advertisement advertising a car is not tailored to each of the individuals that are viewing the TV commercial or viewing the billboard. Some tailoring to demographics might occur, such as if the commercial is displayed during a motor racing event, then some assumptions can be made about the audience demographics, but this is still on a statistical basis not on an individual basis.

In contrast, a computer browser might serve content, such as advertisements, based on the statistics of the user of the computer, smartphone or tablet. This is based on cookie technology and/or IP address based technology that allows an individual user to be tracked on the individual device. This occurs based on the assumption that the computer browser is only used by a single individual.

Content that is tailored to the individual is more effective in being relevant to the individual and in the case of advertising can be more effective if it can be personalized to the individual consumer. This is not previously known to be possible in a one to many display, such as in general broadcasts, such as a TV broadcast or on an electronic billboard because the individual consumers are unknown and the content is therefore necessarily created for general consumption (or perhaps within a demographic for general consumption).

Linking to content displayed which includes a QR code of known from US 2020/0112614 A1 (Life in Mobile Innovations Inc). However, the QR code is unique to a website, and can be used multiple times, with each scan of the QR code linking to the same website. This does not allow for individualization.

The present invention seeks to enable the providing of content via a one to many platform able to be tailored to the individual.

SUMMARY OF THE INVENTION

According to an aspect of the present invention there is provided a method of creating interaction input based on displayed content comprising:

- displaying content on a display device, the content comprising a machine readable resource locator, the resource locator being uniquely generated for a single use;
- capturing the displayed content with a distinct device to the display device;
- extracting the machine readable resource locator from the captured displayed content;
- accessing content from the location of the resource locator, which content enables further interaction with the content on a one to one or an individualised basis.

In an embodiment the method further comprises updating the displayed content with a newly generated machine readable resource locator, the new resource locator also generated for a single use. This update occurs each time the content is accessed.

In this way content can be tailored to the instance of the first access via the unique resource locator generated for that single use and that way content can be tailored to the instance of the next access via the unique resource locator generated for that next single use, and so on.

In an embodiment the display device receives the display content from a TV broadcast. In an embodiment the display device receives the display content in the form of a communication for controlling an electronic billboard. In an embodiment the display device receives the display content from a set top box broadcast. In an embodiment the display device receives the display content from a one to many broadcast. For example, the content may be an advertisement.

In an embodiment the resource locator is a website URL. In an embodiment the resource locator comprises a base URL (such as a host or host and path) and a URL parameter (such as a query or fragment). In an embodiment at least the URL parameter is unique to the single use of that resource locator.

In an embodiment the resource locator is encoded in the form of a matrix optical label, such as for example a QR code.

In an embodiment extracting the resource locator from the displayed content comprises extracting the resource locator from the matrix optical label, for example extracting the URL from the QR code. In an embodiment accessing content comprises opening the website identified by the URL. In an embodiment the content accessed is different to the content displayed on the display device. For example, the different content may be a targeted advertisement that takes account of the identity of the user of the device. Alternatively, the content may be a video. Alternatively, the content may be a game.

In an embodiment the method further comprises entering an input into the device; sending the entered input to a controller; and the displayed content being updated based on the input. For example, the device may control operation of the game, or video, or may be used to make a purchase.

According to an aspect of the present invention there is provided a system for providing interaction input based on displayed content comprising:

- a content source for providing content to be displayed;
- wherein the content source is configured to create the content comprising a machine readable resource locator, the resource locator being uniquely generated for a single use;
- a display device for displaying the content provided from the content source;
- a distinct device to the display device for extracting the machine readable resource locator from the displayed content;
- wherein the distinct device is configured to access content from the location of the resource locator, which content enables further interaction with the content on a one to one or an individualised basis.

In an embodiment the content source is configured to update the displayed content with a newly generated machine readable resource locator after the distinct device accesses the content from the location of the resource locator, the new resource locator also generated for a single use.

In an embodiment the content source is configured to obtain a portion of the content from a content server and to obtain the single use resource locator from an interaction server. In an embodiment the interaction server is configured to pass through input received by the device to the content server (and thus may be referred to as a passthrough server).

In an embodiment the interaction server is configured to receive an access request from the distinct device based on the single use resource locator and is configured to provide the new resource locator to the content server.

In an embodiment the content source is configured to change the provided content when the new resource locator is provided by the interaction server.

In an embodiment the display device changes the content displayed when the change to the provided content is made by the content source.

In an embodiment the interaction is provided through the distinct device. In an embodiment the device is configured to provide input controls for controlling the content.

In an embodiment the interaction is provided through the display device. In an embodiment the interaction is provided through the distinct device and the display device.

According to an aspect of the present invention there is provided a connection server for providing a connection to content able to be interacted with on an individualized basis, the content being for display on a one to many view basis, said content server comprising:

a first input for receiving a first location of a resource accessible by another device;

a displayed content generator for generating a first signal for controlling a display device to display a first image, wherein the first image is created so as to comprise a machine readable resource locator, the resource locator being uniquely generated for a single use and being usable to direct the other device to the first location of the resource;

an output of the signal to a display device for displaying the image;

a second input for receiving a message indicating that the resource at the first location has been accessed;

wherein the first input receives another location of a resource accessible by yet another device when the first location has been accessed by the other device;

wherein the displayed content generator generates a second signal for controlling the display device to display a second image, wherein the second image is created so as to comprise a machine readable resource locator that is uniquely generated for a single use and being usable to direct the yet other device to the second location of the resource.

In an embodiment the locations of the resources are provided by URLs and the locations each comprise different URL parameters. In an embodiment the locations of the resources are each unique to the respective single use by the different URL parameters in the respective locations of the resource, even if they have the same base URL.

According to an aspect of the present invention there is provided a method of providing content able to be interacted with on an individualized basis, the content being for display on a one to many view basis, said method comprising:

receiving a first location of a resource accessible by another device;

generating a first signal for controlling a display device to display a first image, wherein the first image is created so as to comprise a machine readable resource locator, the resource locator being uniquely generated for a single use and being usable to direct the other device to the first location of the resource;

outputting of the signal to a display device for displaying the image;

receiving a message indicating that the resource at the first location has been accessed;

receiving another location of a resource accessible by yet another device when the first location has been accessed by the other device;

generating a second signal for controlling the display device to display a second image, wherein the second image is created so as to comprise a machine readable resource locator that is uniquely generated for a single use and being usable to direct the yet other device to the second location of the resource;

outputting of the second signal to the display device.

According to an aspect of the present invention there is provided a content server for providing content able to be interacted with on an individualized basis, the content being for display on a one to many view basis, said content server comprising:

a storage device for storing content or a receiver for receiving content;

a unique code generator for generating unique single use codes;

a transmitter of each unique single use code;

a receiver of requests for service of content, each request comprising one of the unique single use codes;

a serving system for serving the content when requested;

wherein the serving system individualizes the content served based on each received unique single use code;

wherein the transmitter is configured to transmit another unique single use code when one of the unique single use codes is received.

According to an aspect of the present invention there is provided a method of providing content able to be interacted with on an individualized basis, the content being for display on a one to many view basis, said content server comprising:

storing or receiving content;

generating unique single use codes;

transmitting the unique single use codes;

receiving requests for service of content, each request comprising one of the unique single use codes;

serving the content when requested so that the content is individualized based on each received unique single use code;

wherein a subsequent one of each unique single use code is transmitted when one of the unique single use codes is received.

Throughout the specification and claims, unless the context requires otherwise, the word “comprise” or variations such as “comprises” or “comprising”, will be understood to imply the inclusion of a stated integer or group of integers but not the exclusion of any other integer or group of integers.

DESCRIPTION OF DRAWINGS

In order to provide a better understanding of the present invention example embodiments will now be described with reference to the accompanying drawings, in which.

DETAILED DESCRIPTION OF EXAMPLE EMBODIMENTS

Figure 1:
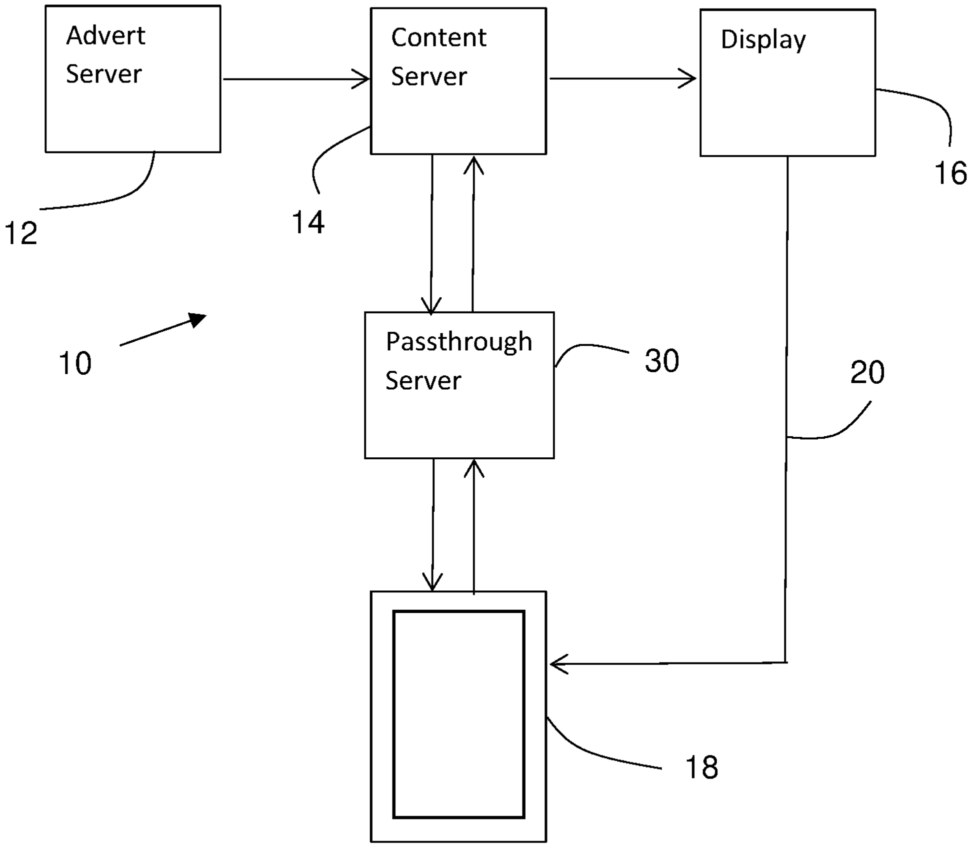
FIG. 1 is a block diagram showing a system according to an embodiment of the present invention.

Referring to FIG. 1, there is provided a system 10 for providing interaction input based on displayed content comprising a content source 14, typically in the form of a server (content server), for providing content to be displayed on a display 16. The content source 14 is typically a streaming service server or a web server. The content server 14 may be configured to broadcast to many displays and the content displayed on the display 16 is previously not personalized to a single viewer. An aspect of the content may be provided by another source, such as an advert server 12. The content server 14 is configured to create the content comprising a machine readable resource locator. The resource locator is generated so as to point to the resource and is also generated to be used for a single use of access to the content. In an embodiment the resource locator is in the form of a matrix optical label, such as a QR code. The resource locator may be provided by an interaction server.

The display 16 may be a computer monitor, a television (TV) set, or an electronic sign or billboard. Typically, the display 16 has no manner of receiving an input from a viewer of the content displayed on the display. For example, a viewer of TV broadcast cannot provide input into, nor interact with, the content being broadcast. Likewise, the viewer of an electronic billboard cannot provide input into, nor interact with, the content being displayed on the billboard. Accordingly, the present invention allows for input to be received for interaction with the content that is displayed in a manner that is different to situations prior to this invention. Currently where input can be provided, by for example a remoted control of a television, it is limited to the situation of a television remote control only being able to select what to display (changing channels). It is not interaction with the content in the same manner one interacts with content on a personal computer on a one to one basis.

The resource locator can be viewed 20 by a device 18, such as a smartphone, which can extract, such as by decoding, the resource locator from the matrix optical label (eg. QR code) into a machine usable resource locator, such as a URL, and more typically a website address with an argument unique to the single use. This might be for example: www.websitedomainname.com/123uniqueargument. The argument unique in URL terminology may be considered a query and/or a fragment. Contrast this with a static QR code or website address that is not unique to the capture, also contrast with the static QR code that can be used multiple times, (as occurs in US2020/0112614 A1), with a single use QR code which is only able to be used once. The effect is to take a destination URL and encompass it into another URL that points to a custom server destination with information able to identify the user and or the unique instance of use of access to the content displayed.

In an embodiment if the QR code is attempted to be used again after the first use, one the following may occur: it will not direct to a working resource; it will direct to an error message indicating that the QR code has already been used; or it will be treated differently and as if it was a multi-use resource locator (for example, to a website that is not operating on a one to one basis or individualized, without some other mechanism for making it individualized, such as a login or using cookie technology).

The resource may be provided by the interaction server, which in this example is a passthrough server 30, such as a webserver. The webserver 30 is able to exchange data with the content server 14.

The device 18 is configured to access content from the location of the resource locator, which in this example is the interaction/passthrough server 30, which accessed content enables further interaction with the content on an individualized basis, that is, the content can be displayed either on the display 16 or the device 18 or both 16, 18 and is specific to the individual using the device 16. Contrast this specific interactive content with broadcast content that is not able to be interacted with. This may include receiving input from the device 18 and controlling the content accordingly. It may adapt the content according to the identity of the individual user of the device 18 or group/class that the individual is known to be a member of. The browser of the device 18 can be redirected to the destination with the unique identifier and/or context information of the displayed content being used as metadata to customize the destination for the user. The metadata can also be used externally and/or recorded to a user's profile.

In an embodiment the interaction passthrough server 30 may generate the resource locator and provide it to the content sever 14 in encoded form, or in unencoded form and the content server 14 encodes it into the matrix optical label. In an embodiment the content source 14 is configured to update the displayed content with a newly generated machine readable resource locator after the device 18 accesses the content from the location of the resource locator, the new resource locator also generated for a single use.

In an embodiment the interaction server 30 is configured to receive an access request from the device 18 based on the single use resource locator and is configured to provide the new resource locator to the content server 18.

In an embodiment the content server 18 is configured to change the provided to the display when the new resource locator is provided by the interaction server 30, such as by changing the QR code or by removing the QR code. For example, the QR code may only be available periodically or at particular (or random) times. In another example, it may change at particular (or random) times—each time linking to an individualized access to content.

In an embodiment the display device changes the content displayed when the change to the provided content is made by the content server 14.

In an embodiment the interaction is provided through the distinct device 18.

In an embodiment the interaction is provided through the display device 16 for situations where it can operate in this manner (for example by displaying the result of an input via the device 18).

The servers 12, 14, 30 and device 18 may be machines created for the purpose described herein or they may be computers configured with software comprising instructions for controlled a respective one or more processors to operate in the manner described. The skilled person can readily use the present specification to enable them to translate the combination of functional requirements described into one or more computer programs (software) to control the processors to operate in the manner described herein and to perform as the specific apparatus described herein. Without wishing to be limited, an aspect of the invention is related to the manner of configuring general purpose machines so as to become specific machines that operate as described herein so that they may perform the methods described herein and be improved at least by being able to do something they are unable to do as general purpose machines.

While the invention may find application in advertising or other fields of economic endeavour, an aspect is directed to the technical implementation of the machines and methods that enable that application.

Figure 2:
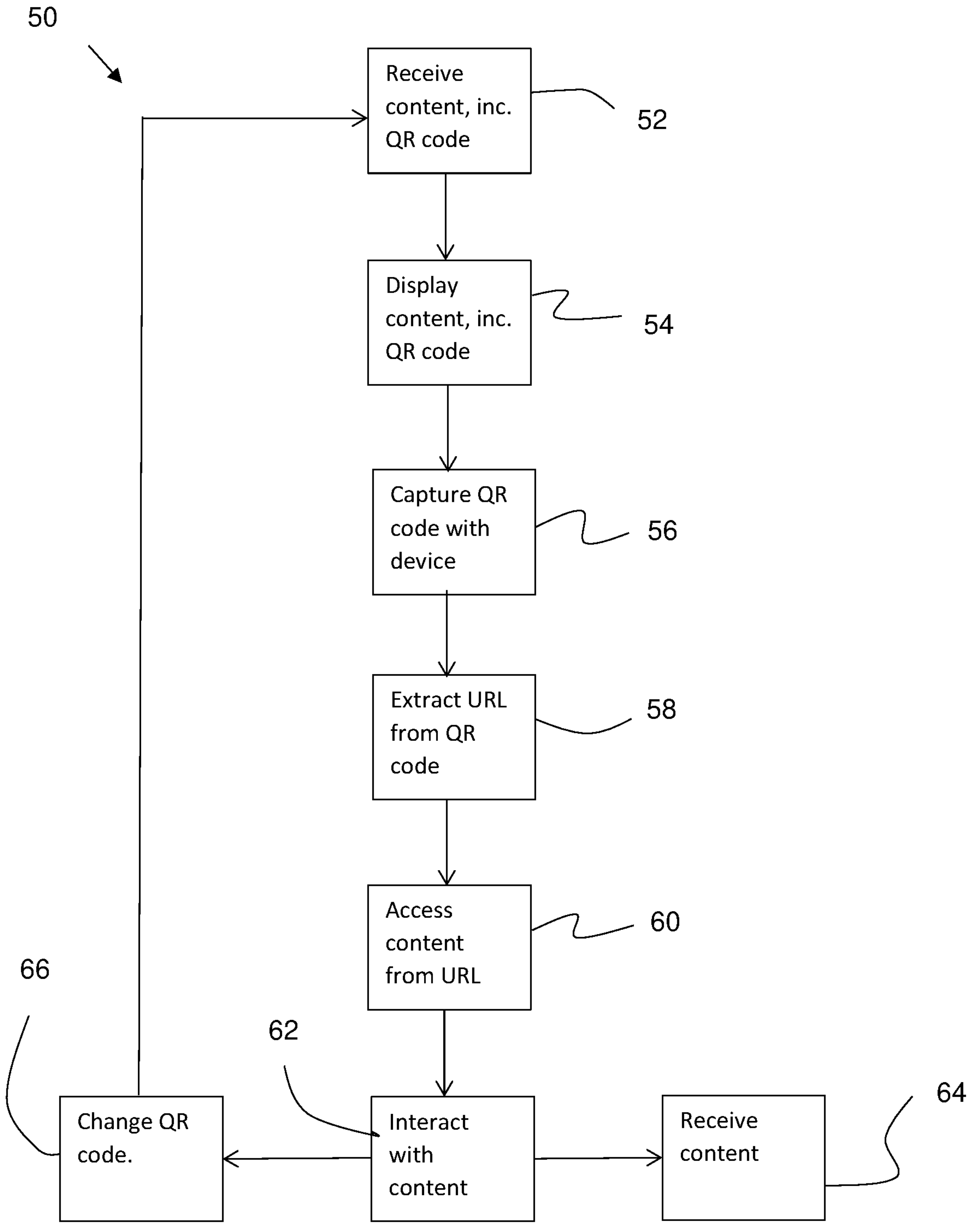
FIG. 2 is a flow chart showing a method according to an embodiment of the present invention.

Referring to FIG. 2, there is an embodiment of a method 50 of creating interaction input based on displayed content comprising: receiving content 52, the content comprising a machine readable resource locator, such as a URL encoded as a QR code, the resource locator being uniquely generated for a single use. The content is displayed 54 on a display device, such as device 16. A device, such smartphone 18 captures 56 the displayed content. The machine readable resource locator is extracted 58 from the displayed content. The content is accessed 60 from the location defined by the resource locator. Interaction 62 with the content enabled on an individualised basis. The interaction may comprise receiving input via the device 18. The interaction may comprise receiving 64 content, such as from server 30, according to the received input. The received content may be displayed on the device 18 and/or the display 16.

Further the resource locator may be changed 66, such as by changing or removing the QR code from the displayed on the display 16. In an embodiment changing the resource locator comprises updating the displayed content with a newly generated machine readable resource locator. Preferably, the new resource locator is also generated for a single use and is unique to that single use. In this way content can be tailored to the instance of the first access via the unique resource locator generated for that single use and that way content can be tailored to the instance of the next access via the unique resource locator generated for that next single use, and so on.

In an embodiment the display device receives 52 the display content from a TV broadcast. In an alternative embodiment the display device receives 52 the display content in the form of a communication for controlling an electronic billboard.

In an embodiment extracting the resource locator from the displayed content comprises extracting the URL from the QR code. In an embodiment assessing content comprises opening the website identified by the URL. In an embodiment the resource locator comprises a base URL (such as a host or host and path) and a URL parameter (such as a query or fragment). In an embodiment at least the URL parameter is unique to the single use of that resource locator.

In an embodiment the method further comprises entering an input into the device; sending the entered input to a controller; and the displayed content being updated based on the input.

Figure 3:
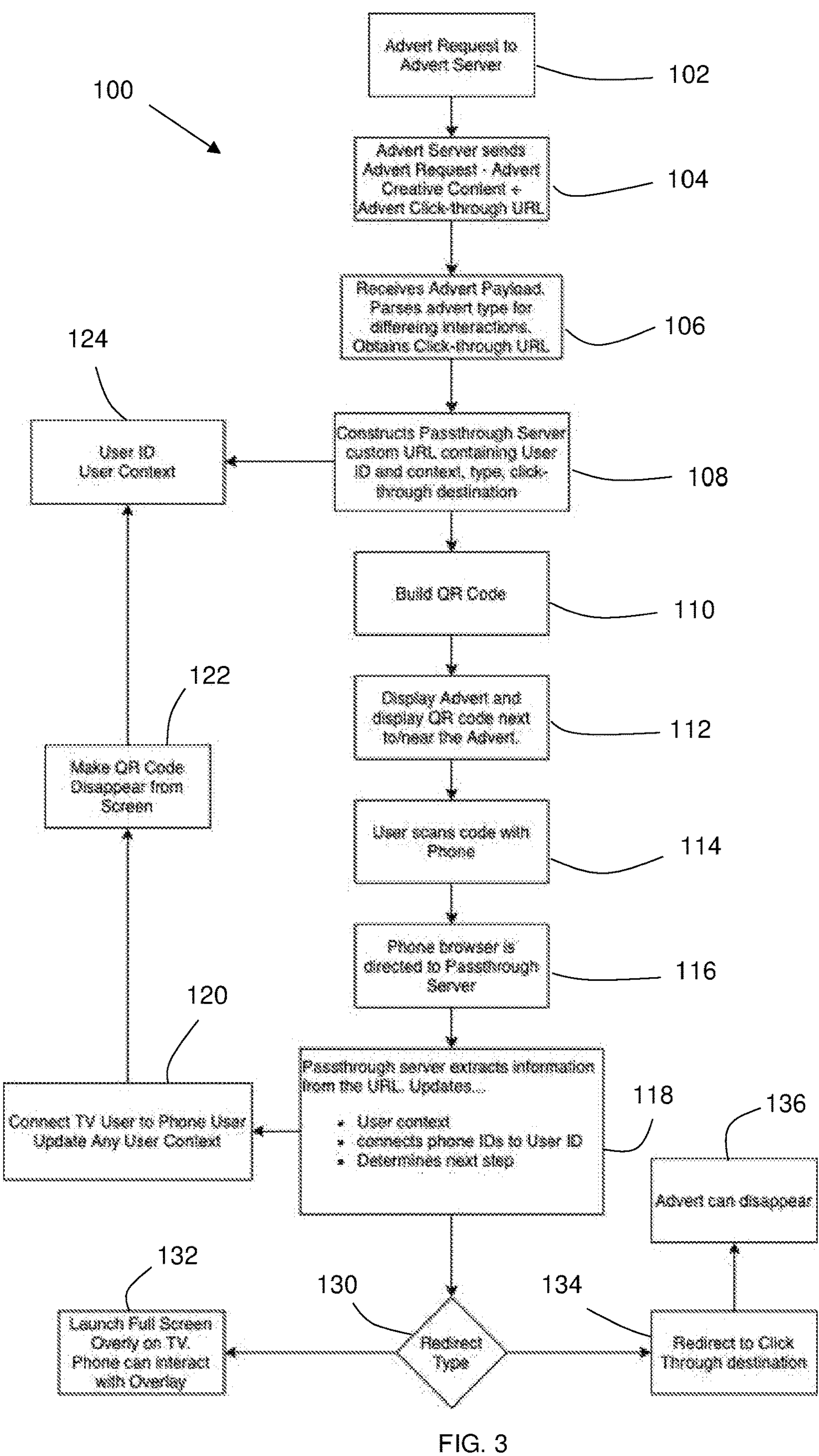
FIG. 3 is a flow chart showing a method according to an embodiment of the present invention.

Referring to FIG. 3, method 100 is for using the present invention with advertising broadcast for display on a TV. The method 100 commences with an advertisement being requested 102 such as from an advertisement server 12. The advertisement in this case is the initial content to be displayed and is requested by the content server 14.

At 104 the advert server 12 sends an advert request for creative content such as from a database of advertisement content and an advert click through URL from the interaction server. At 106 the advert payload is received by the content server 14. The payload is parsed by the advert server 12 to determine advert type for differing interactions.

The unique URL is generated 106 (typically by the interaction/passthrough server 30) from the advert type and preferably contains a user ID (eg. in the case of a known set top box user or content subscriber ID) context is used in step 124, described below. The URL will also contain an advertising context, that is, the context derived from the advertisement payload. These are the attributes of the advertisement that include clickthrough destination, anti-fraud trackers, type of advertisement (e.g. elements for the user to interact with a click-through advert to a web page, an advert that redirects to another application on the device (e.g. an App Store), etc), time etc. and form a unique single use code that is embedded in the URL as an argument added to the base URL of a website, so as to make the URL unique.

The QR code is built 110 from the URL using standard known techniques.

The advert is displayed 112 on the TV display including the QR code which is for example displayed next to or near the advert.

The user scans 114 the QR code with their smartphone 18.

The phone browser is directed 116 to the interaction/passthrough server 30. The server 30 can be located on the display device or on another server either local or external to the display device.

The passthrough server 30 extracts 118 information from the URL and updates the user context, connects the Phone IDs to the user ID, and determines next step. At 120, the TV user is connected to the phone user ID and the user context is updated.

The QR code is removed from the screen at 122.

The user ID is connected with user context information at 124. This can use useful for further targeted advertising, loyalty purposes or other reasons. The user context can contain attributes such as location, summary of historic actions (e.g. genres of TV shows watched), adverts engaged with (e.g. clicked through, scanned), matched data from other external sources (e.g. buying behaviour). These types of attributes are informed by the behaviour of the user on the display device and also the connection of the device (e.g. phone) scanning the QR code which allows activities on both devices to be aggregated and summarised.

At 130, the redirect type is determined. The redirect is based on the advertisement context parsed in 106. The context will indicate whether at 132 the redirect will be an overlay over the display device representing the click-through destination of the advert, or alternatively at 134 a redirect on the phone device to show the click-through destination of the advert on a browser on the phone. The Passthrough server has reported that the QR has been scanned by the phone so at 136 the QR code is now removed from the Display Device as noted at step 122.

Figure 4:
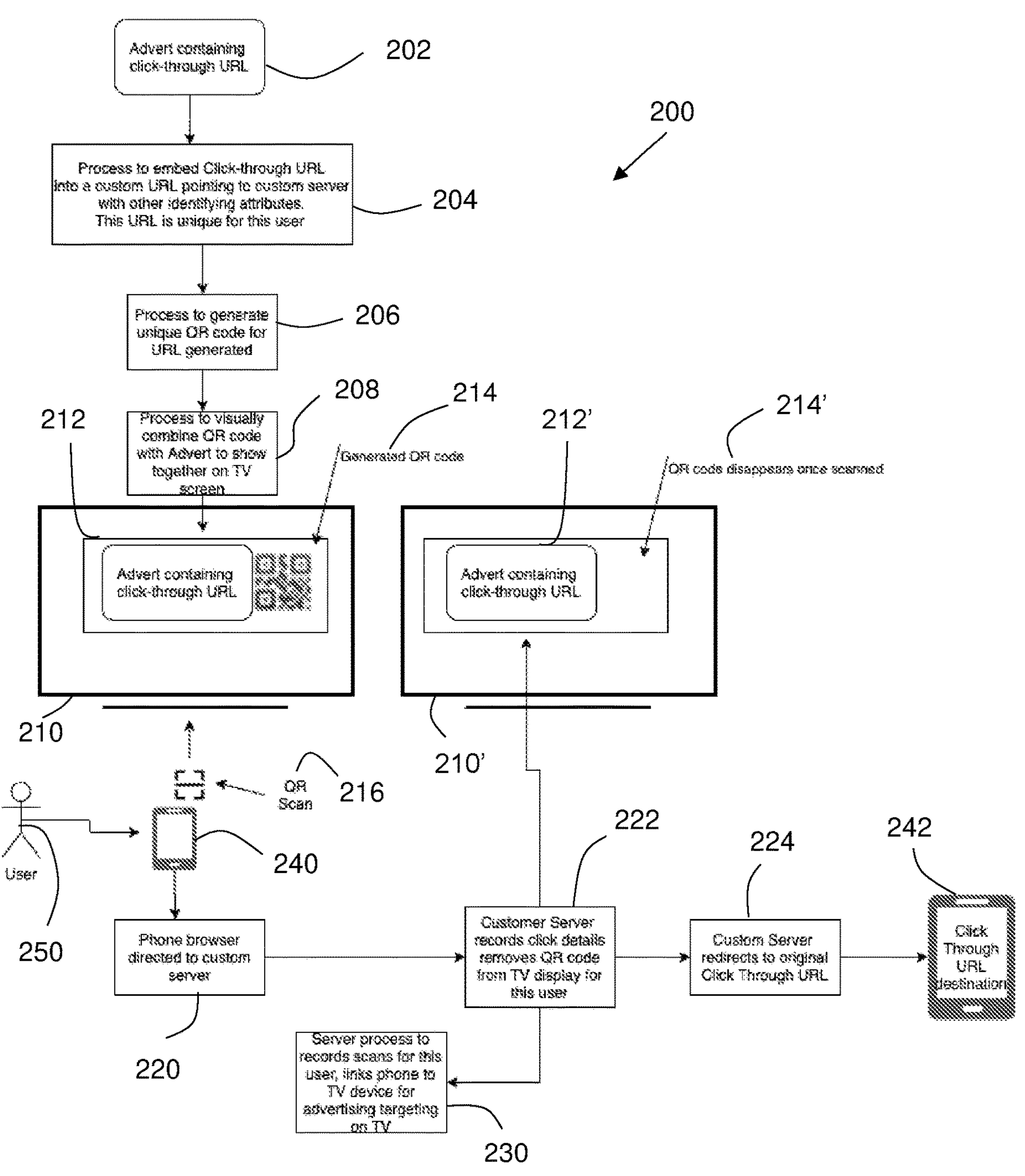
FIG. 4 is a flow chart showing a method according to an embodiment of the present invention.

Referring to FIG. 4, a further method 200 is shown. The method 200 commences with the advert containing the click through URL being retrieved at 202, as described above. The advert is processed 204 to embed the click through URL into a custom URL with other customer identifying attributes. This custom URL is unique to the user and/or single use.

The unique QR code for the URL generated 206.

At 208 the QR code is processed to combine it with the advert so that it is shown 210 together on TV screen (display 16). Shown on the screen 210 (of display 16) is the advert 212 with the QR code 214. The QR code is scanned at 216 by the smartphone 240 (device 18) associated with a user 250.

The phone browser is directed 220 to customer server (interaction/clickthrough server 30). Customer server records 222 click details and removes the QR code from the TV display for that user. Shown is the display, now 210', with the advert 212' and with the QR code removed 214'.

Custom server redirects 224 to original click through URL. The click through URL destination is displayed on the phone 242 to permit further interaction with content displayed on the phone.

Further the interaction server records 230 scans for this user, and records a link to the phone to the TV device for future advertising targeted on the TV to that user.

Figure 5:
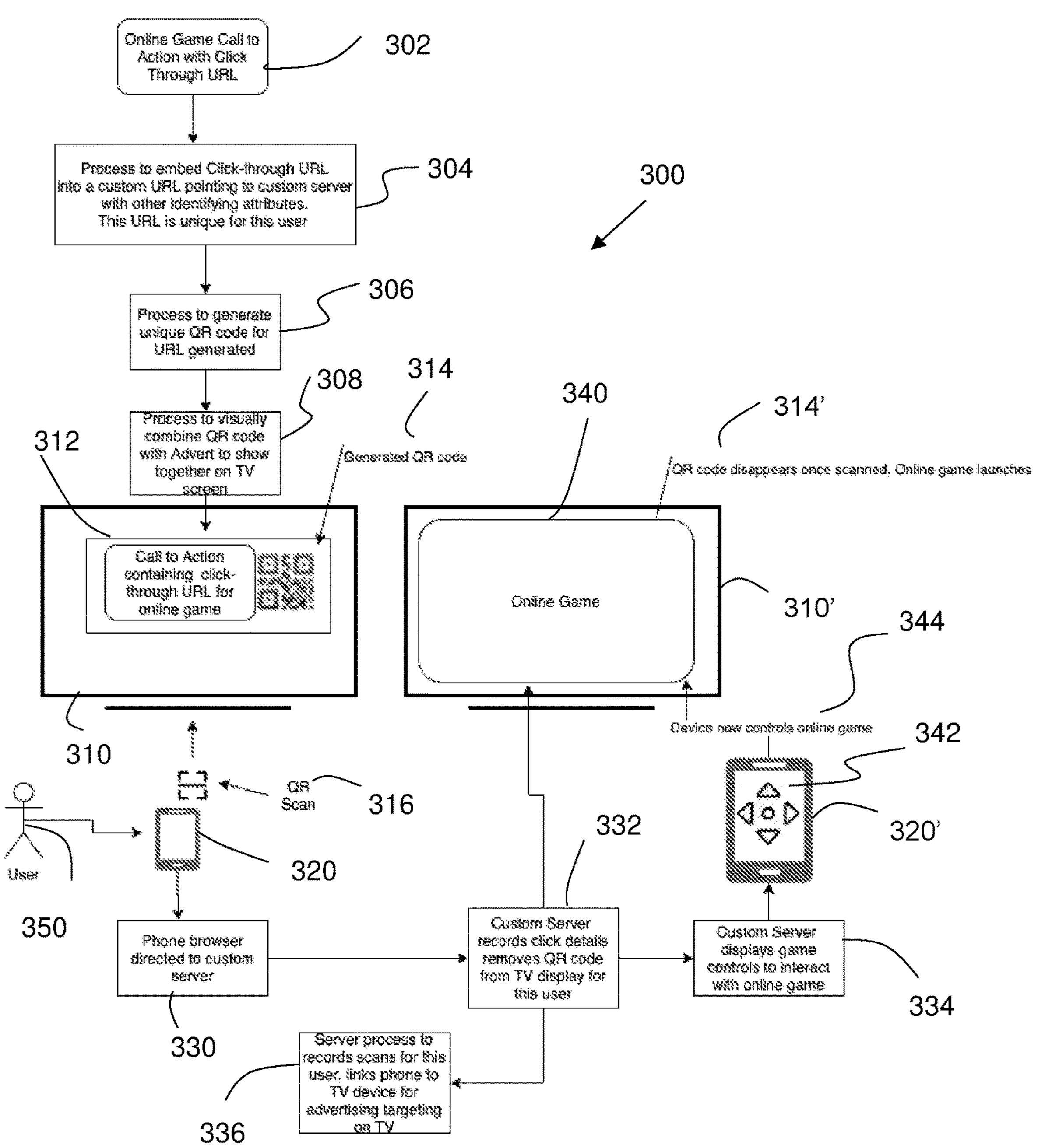
FIG. 5 is a flow chart showing a method according to an embodiment of the present invention.

Referring to FIG. 5, this method 300 for interaction with an online game (or an advert for the online game) commences with an online game call to action click through URL 302. This could be a banner style graphic indicating that a game can be played by scanning the QR code with the phone.

The click trough URL is embedded 304 into a custom URL pointing to custom server (interaction/clickthrough server 30) with other identifying attributes. These attributes can include information on the user (location, past behaviour, past click activity, past games interacted with, or the previous game state from a previous play). This URL is unique to the user.

The unique QR code is generated 306 from the URL.

The QR code is visually combined 308 with the advert to show together on TV screen 310 (display 16).

Shown on the screen 310 is the advert's call to action 312 and the QR code 314.

The QR code is scanned 316 by the device 320 associated with a user 350.

The phone browser is directed 330 to the custom server Interaction server 30).

The custom server records 332 click details, removes the QR code from the TV display for this user. Shown is the screen 310' now with the online game 340 and the QR code removed 314'.

The custom server displays 334 game controls 342 to interact with online game at 334. The controls 342 are displayed on the phone 320' and are used to control 344 the game displayed on the TV screen 310'.

The server records 336 scans of the QR code for this user, records a link between the phone and the TV device for future advertising targeting on TV.

Figure 6:
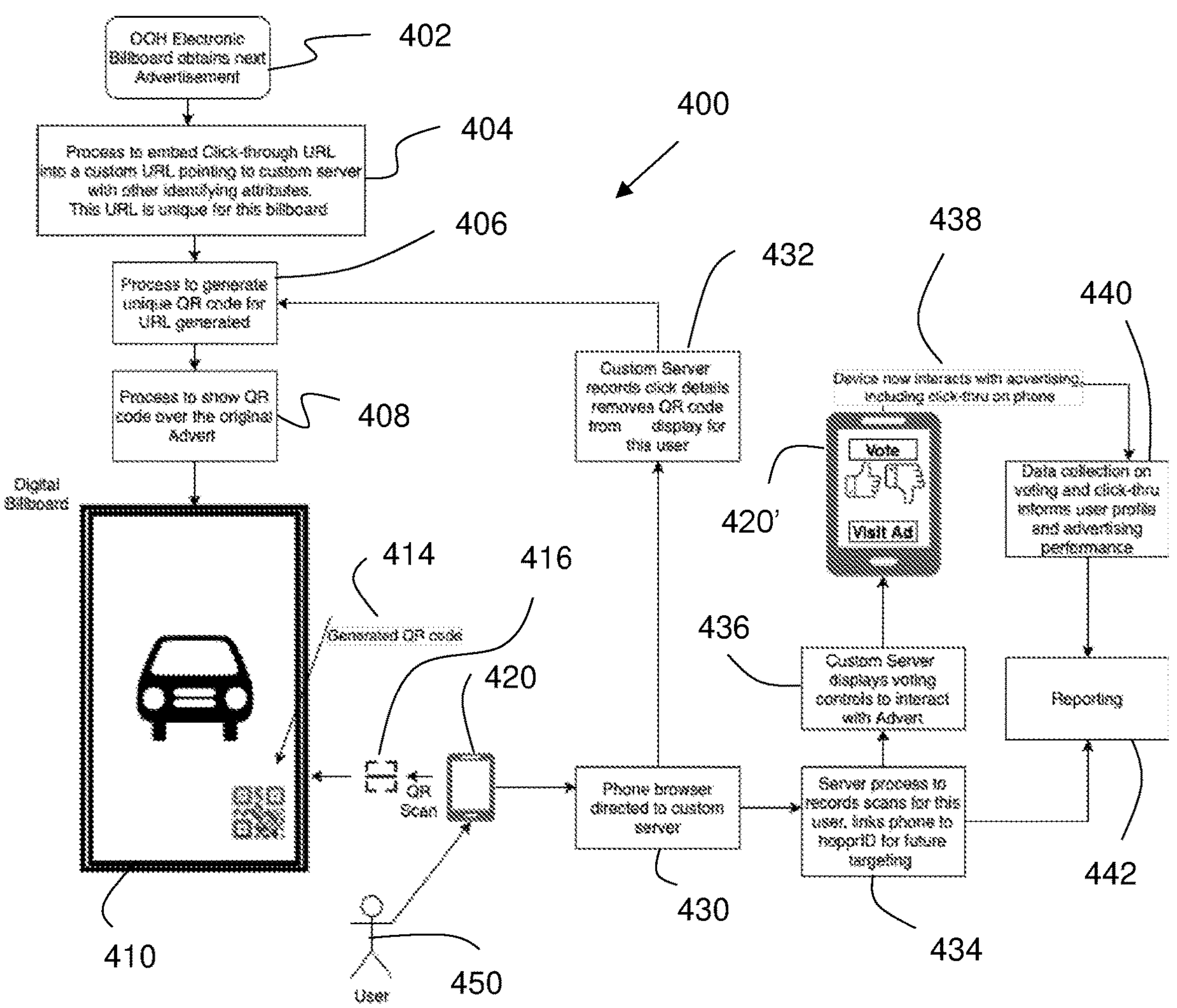
FIG. 6 is a flow chart showing a method according to an embodiment of the present invention.

In FIG. 6, the method 400 of interacting with content on an out of home (OOH) electronic billboard commences with the electronic billboard obtaining 402 the next advertisement.

At 404 the click through URL is embedded 404 into a custom URL pointing to custom server (interaction server 30) with other identifying attributes. URL is unique to the particular billboard.

The URL is processed 406 to generate a unique QR code.

The advert is processed 408 to show the QR code over the original advert.

The billboard 410 is shown with an advert for a car (for example) and the QR code 414.

The QR code is scanned 416 with device 420 associated with a user 450. The phone browser is directed 430 to the custom server. The Custom server records 432 click details and removes QR code from the display for this user and is then processed to create a new URL and QR code (back at step 406).

At 434, the server records scans for this user, records a link to the phone and to the user's ID for future targeting.

The custom server displays voting controls on the device 420' to interact 438 with the advert shown on the device 420'. The device 420' that interacts with the advertising including through click through on the phone. At 440 collection of the voting and click through informs the user profile and advertising performance. Recording is generated at 442.

The present invention can be used to measure and track usage when normally this would not be possible. Data collected can include display identification, time of interaction, geo-location of the device 18, identification of the displayed content. Further data from the interaction can also be recorded.

The invention has beneficial application in advertising tracking by providing infrastructure to achieve what was previous not able to be achieved.

The present invention provides an advantage in that it does not require the display to have an input because the unique QR code can be used to associate the user's device 16 with the content displayed and will allow individualised or one to one interaction, which is not possible on a display that has no input and for content (such as adverts) that are broadcast on a one to many basis.

Modifications may be made to the present invention within the context of that described and shown in the drawings. Such modifications are intended to form part of the invention described in this specification.

The invention claimed is:

1. A method of creating interaction input based on displayed content comprising:

displaying content on a display device, the content comprising a machine readable resource locator, the resource locator being uniquely generated for a single use, wherein the resource locator is a website URL comprising a base URL and a URL parameter, wherein the URL parameter is unique to the single use of that resource locator;

capturing the displayed content with a distinct device to the display device;

extracting the machine readable resource locator from the captured displayed content;

accessing content from the location of the resource locator, which content enables further interaction with the content on a one to one or an individualised basis.

2. A method according to claim 1, wherein the method further comprises updating the displayed content with a newly generated machine readable resource locator, the newly generated resource locator being generated for a single use wherein updating occurs each time the content is accessed.

3. A method according to claim 1, wherein the display device receives the display content from a TV broadcast.

4. A method according to claim 1, wherein the display device receives the display content in the form of a communication for controlling an electronic billboard.

5. A method according to claim 1, wherein the display device receives the display content from a set top box broadcast.

6. A method according to claim 1, wherein the display device receives the display content from a one to many broadcast.

7. A method according to claim 1, wherein the resource locator is encoded in the form of a matrix optical label and extracting the resource locator from the displayed content comprises extracting the resource locator from the matrix optical label.

8. A method according to claim 1, wherein the method further comprises entering an input into the device; sending the entered input to a controller; and the displayed content being updated based on the input.

9. A system for providing interaction input based on displayed content comprising:

a content source for providing content to be displayed;

wherein the content source is configured to create the content comprising a machine readable resource locator, the resource locator being uniquely generated for a single use, wherein the resource locator is a website URL comprising a base URL and a URL parameter, wherein the URL parameter is unique to the single use of that resource locator;

a display device for displaying the content provided from the content source;

a distinct device to the display device for extracting the machine readable resource locator from the displayed content;

wherein the distinct device is configured to access content from the location of the resource locator, which content enables further interaction with the content on a one to one or an individualised basis.

10. A system according to claim 9, wherein the content source is configured to update the displayed content with a newly generated machine readable resource locator after the distinct device accesses the content from the location of the resource locator, the new resource locator also generated for a single use.

11. A system according to claim 9, wherein the content source is configured to obtain a portion of the content from a content server and to obtain the single use resource locator from an interaction server.

12. A system according to claim 11, wherein the interaction server is configured to pass through input received by the device to the content server.

13. A system according to claim 9, wherein the interaction server is configured to receive an access request from the distinct device based on the single use resource locator and is configured to provide the new resource locator to the content server.

14. A system according to claim 9, wherein the content source is configured to change the provided content when the new resource locator is provided by the interaction server.

15. A system according to claim 14, wherein the display device changes the content displayed when the change to the provided content is made by the content source.

16. A system according to claim 9, wherein the interaction is provided through the distinct device.

17. A connection server for providing a connection to content able to be interacted with on an individualized basis, the content being for display on a one to many view basis, said connection server comprising:

a first input for receiving a first location of a resource accessible by another device;

a displayed content generator for generating a first signal for controlling a display device to display a first image, wherein the first image is created so as to comprise a machine readable resource locator, the resource locator being uniquely generated for a single use and being usable to direct the other device to the first location of the resource;

an output of the signal to a display device for displaying the image;

a second input for receiving a message indicating that the resource at the first location has been accessed;

wherein the first input receives another location of a resource accessible by yet another device when the first location has been accessed by the other device;

wherein the displayed content generator generates a second signal for controlling the display device to display a second image, wherein the second image is created so as to comprise a machine readable resource locator that is uniquely generated for a single use and being usable to direct the yet other device to the second location of the resource.

18. A connection server according to claim 17, wherein the locations of the resources are provided by URLs and the locations each comprise different URL parameters.

19. A method of providing content able to be interacted with on an individualized basis, the content being for display on a one to many view basis, said method comprising:

receiving a first location of a resource accessible by another device;

generating a first signal for controlling a display device to display a first image, wherein the first image is created so as to comprise a machine readable resource locator, the resource locator being uniquely generated for a single use and being usable to direct the other device to the first location of the resource;

outputting of the signal to a display device for displaying the image;

receiving a message indicating that the resource at the first location has been accessed;

receiving another location of a resource accessible by yet another device when the first location has been accessed by the other device;

generating a second signal for controlling the display device to display a second image, wherein the second image is created so as to comprise a machine readable resource locator that is uniquely generated for a single use and being usable to direct the yet other device to the second location of the resource;

outputting of the second signal to the display device.

20. A content server for providing content able to be interacted with on an individualized basis, the content being for display on a one to many view basis, said content server comprising:

a storage device for storing content or a receiver for receiving content;

a unique code generator for generating unique single use codes;

a transmitter of each unique single use code;

a receiver of requests for service of content, each request comprising one of the unique single use codes;

a serving system for serving the content when requested;

wherein the serving system individualizes the content served based on each received unique single use code;

wherein the transmitter is configured to transmit another unique single use code when one of the unique single use codes is received, wherein each unique single use code is a resource locator being a website URL comprising a base URL and a URL parameter, wherein the URL parameter is unique to the single use of that resource locator.

21. A method of providing content able to be interacted with on an individualized basis, the content being for display on a one to many view basis, said content server comprising:

storing or receiving content;

generating unique single use codes;

transmitting the unique single use codes;

receiving requests for service of content, each request comprising one of the unique single use codes;

serving the content when requested so that the content is individualized based on each received unique single use code;

wherein a subsequent one of each unique single use code is transmitted when one of the unique single use codes is received, wherein each unique single use code is a resource locator being a website URL comprising a base URL and a URL parameter, wherein the URL parameter is unique to the single use of that resource locator.

22. The method of claim 1, wherein each interaction is individualised for each instance of assessing of content using the single use resource locator.

23. The method of claim 1, wherein the resource locator comprises a unique identifier generated for the single use.

24. The method of claim 1, wherein the use of the resource locator to access content is combined with a time of initial access of the content to determine the content which enables the further interaction.

25. The method of claim 1, wherein the URL parameter is changed after each use of the resource locator to access content from the location of the resource locator, and the machine readable resource locator is changed when the URL parameter is changed.

* * * * *